United States Patent
Hekmatshoartabari

(10) Patent No.: US 10,679,123 B2
(45) Date of Patent: Jun. 9, 2020

(54) IMPLEMENTATION OF SIGMOID FUNCTION USING NON-COMPLEMENTARY TRANSISTORS

(71) Applicant: International Business Machines Corporation, Armonk, NY (US)

(72) Inventor: Bahman Hekmatshoartabari, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 15/496,027

(22) Filed: Apr. 25, 2017

(65) Prior Publication Data

US 2018/0307977 A1    Oct. 25, 2018

(51) Int. Cl.
*G06N 3/063* (2006.01)
*G06N 3/04* (2006.01)

(52) U.S. Cl.
CPC ......... *G06N 3/0635* (2013.01); *G06N 3/0481* (2013.01); *G06N 3/063* (2013.01)

(58) Field of Classification Search
None
See application file for complete search history.

(56) References Cited

U.S. PATENT DOCUMENTS

| | | | |
|---|---|---|---|
| 5,355,436 A | 10/1994 | Shin et al. | |
| 5,475,794 A | 12/1995 | Mashiko | |
| 5,717,833 A | 2/1998 | Neely | |
| 6,754,645 B2 | 6/2004 | Shi et al. | |
| 6,763,340 B1 | 7/2004 | Burns et al. | |
| 8,572,144 B2 | 10/2013 | Vigoda et al. | |
| 9,368,611 B2 | 6/2016 | Galy et al. | |

OTHER PUBLICATIONS

Hynna, et al., Neuronal Ion-Channel Dynamics in Silicon, Proceedings of the IEEE International Symposium on Circuits and Systems (ISCAS 2006), 2006, pp. 3614-3617 (Year: 2006).*

Krumm, Circuit Analysis Methodology for Organic Transistors, Doctoral Thesis, Universitaet Erlangen—Nuernberg, 2008, pp. 1-183. (Year: 2008).*

Pan, Dong, et al., "A VLSI Implementation of Mixed-Signal mode Bipolar Neuron Circuitry", IEEE 2003, pp. 971-976.

Lu, Junjie, et al., "A Floating-Gate Analog Memory with Bidirectional Sigmoid Updates in a Standard Digital Process", IEEE, 2013, pp. 1600-1603.

(Continued)

*Primary Examiner* — Wilbert L Starks

(74) *Attorney, Agent, or Firm* — Harrington & Smith

(57) ABSTRACT

An analog circuit includes a first stage comprising a first stage transistor, wherein the first stage transistor is configured to receive an input signal; and a second stage coupled to the first stage, the second stage comprising a pull-up transistor and a pull-down transistor, the pull-up transistor and the pull-down transistor having the same channel type as the first stage transistor. One of the pull-up transistor and the pull-down transistor receives the input signal and the other of the pull-up transistor and the pull-down transistor receives an output of the first stage transistor. The first stage and the second stage are configured to generate a sigmoid function.

20 Claims, 14 Drawing Sheets

(56) References Cited

OTHER PUBLICATIONS

Yamashita, Yosuke, et al., "A Neuron Circuit Model with Smooth Nonlinear Output Function", NOLTA'07, Sep. 16-19, 207, pp. 11-14.

Chaste, Neeraj, et al., "Analog VLSI Implementation of Neural Network Architecture for Signal Processing", International Journal of VLSI design & Communication Systems (VLSICS) vol. 3, No. 2, Apr. 2012, pp. 243-259.

Zamanlooy, Babak, et al., "An Analog CVNS-Based Sigmoid Neuron for Precise Neurochips", IEEE Transactions on Very Large Scale Integration (VLSI) Systems, 2016, 13 pages.

Bayraktaroglu, Ismet, et al., "ANNSyS: an Analog Neural Network Synthesis System", Neural Networks 12 (1999), pp. 325-338.

Pushpa, P. Motcha Mary Rathi, et al., "Implementation of Hyperbolic Tangent Activation Function in VLSI", International Journal of Advanced Research in Computer Science and Technology, Jan.-Mar. 2014, pp. 225-228.

Lansner, John, et al., "An Analog CMOS Chip Set for Neural Networks with Arbitrary Topologies", IEEE Transactions on Neural Networks, vol. 4, No. 3, May 1993, pp. 441-444.

St. Amant, Renee, et al., "General-Purpose Code Acceleration with Limited-Precision Analog Computation", IEEE 2014, pp. 505-516.

Genov, Roman, et al., "Dynamic MOS Sigmoid Array Folding Analog-to-Digital Conversion", IEEE Transactions on Circuits and Systems—I:Fundamental Theory and Applications, Oct. 2016, 5 pages.

Ayyavoo, Mithila, et al., "Analog Activation Function for CMOS Pulsed Neural Network Design using 180nm Technology", International Journal of Computing, Communications & Instrumentation Engg.(IJCCIE), vol. 3, Issue 2, 2016, pp. 218-220.

Chible, Hussein, et al., "CMOS VLSI Hyperbolic Tangent Function & its Derivative Circuits for Neuron Implementation", International Journal of Electronics and Computer Science Engineering, ISSN-2277, 1956, pp. 1162-1169.

\* cited by examiner

//\# IMPLEMENTATION OF SIGMOID FUNCTION USING NON-COMPLEMENTARY TRANSISTORS

BACKGROUND

The exemplary embodiments described herein relate generally to transistors and, more specifically, to the use of circuits implementing a sigmoid function for applications employing a single transistor type.

A sigmoid function is a mathematical function that has a sigmoid or symmetrical "S-shaped" curve. The sigmoid function may have particular applications as an activation function in a computational network to define the output of a node given one or more inputs to the node. In this capacity, the sigmoid function may be used to transform linear inputs to nonlinear outputs, bound an output to between 0 and 1 so that the output can be interpreted as a probability, and reduce the complexity for computation as compared to other types of activation functions.

Implementation of the sigmoid function, $f(x)=1/(1+e^{-x})$, as an activation function is of particular interest in analog neural networks, where sigmoid thresholding units are used for evaluating the outputs of the neurons in the hidden layers (between the input and output layers) and/or the output layers themselves. When implementing the sigmoid function in semiconductor devices such as complementary metal oxide semiconductors (CMOSs), typically an amplifier or buffer unit (or an analog-to-digital converter in mixed signal circuits) is configured to produce the sigmoid function. However, such implementations are not directly transferrable to non-complementary transistors.

BRIEF SUMMARY

In one aspect, an analog circuit comprises: a first stage comprising a first stage transistor, wherein the first stage transistor is configured to receive an input signal; and a second stage coupled to the first stage, the second stage comprising a pull-up transistor and a pull-down transistor, the pull-up transistor and the pull-down transistor having the same channel type as the first stage transistor. One of the pull-up transistor and the pull-down transistor receives the input signal and the other of the pull-up transistor and the pull-down transistor receives an output of the first stage transistor. The first stage and the second stage are configured to generate a sigmoid function.

In another aspect, a sigmoid function-producing analog circuit comprises: an inverter comprising a first transistor configured to receive an input voltage; and a buffer comprising a second transistor coupled to a third transistor, the second transistor configured to receive the input voltage, and the third transistor configured to receive an output voltage from the first transistor. The first transistor, the second transistor, and the third transistor are of the same channel type.

In another aspect, a method comprises: receiving an input voltage at a first transistor and at a second transistor; inverting the input voltage from the first transistor and applying the inverted input voltage to a third transistor; and generating a sigmoid function output from the second transistor and the third transistor.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The term "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
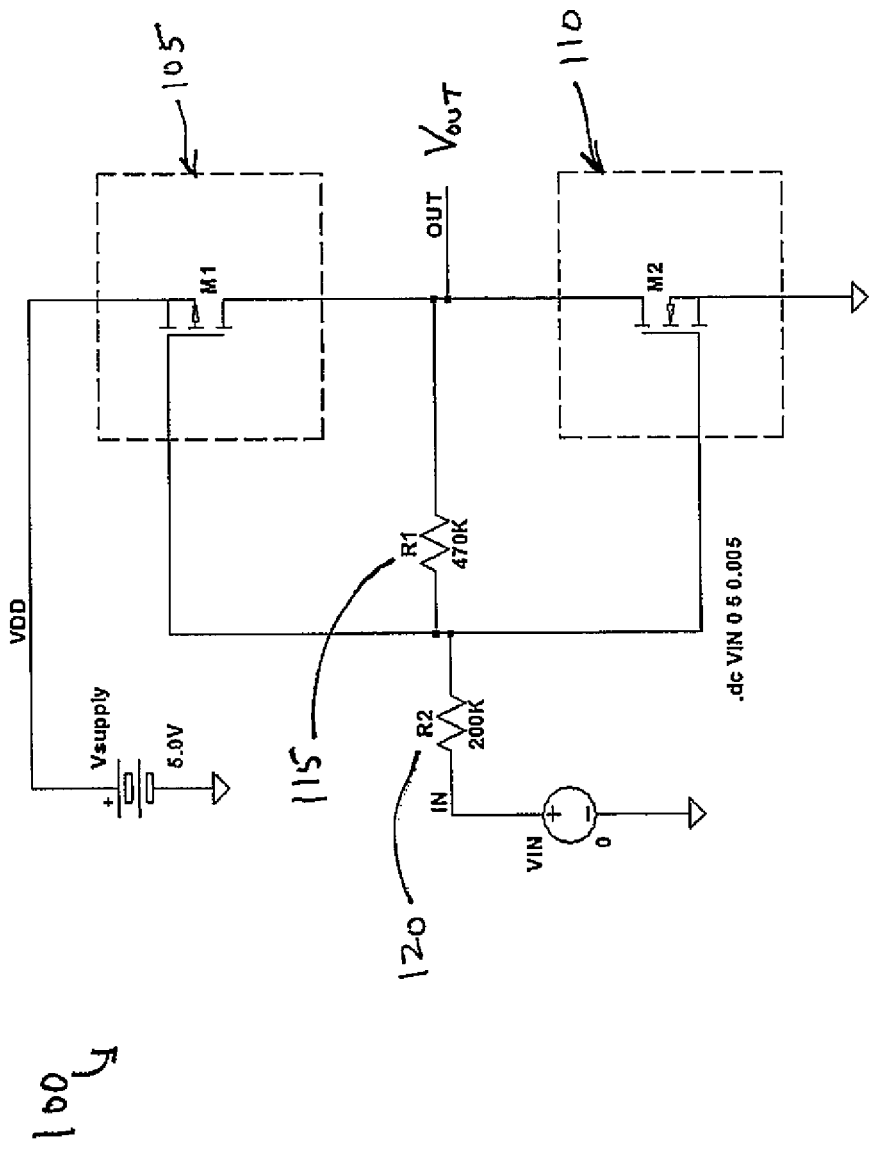
FIG. 1 is schematic diagram of a CMOS stage inverter circuit.

Referring to FIG. 1, one exemplary embodiment of a CMOS stage inverter circuit is designated generally by the reference number 100 and is hereinafter referred to as "CMOS inverter circuit 100." The CMOS inverter circuit 100 may be used in a structure comprising a complementary pair of n- and p-channel metal oxide semiconductor (MOS) transistors, such as a first transistor M1 (shown at 105) and a second transistor M2 (shown at 110) coupled with a first resistor R1 (shown at 115) and a second resistor R2 (shown at 120). The second resistor R2 120 may receive a voltage input ($V_{in}$). The first transistor M1 may be coupled to a supply voltage ($V_{supply}$) to receive a drain supply voltage ($V_{dd}$). An output voltage ($V_{out}$) may be output from the first transistor M1 105 and the second transistor M2 110.

Figure 2:
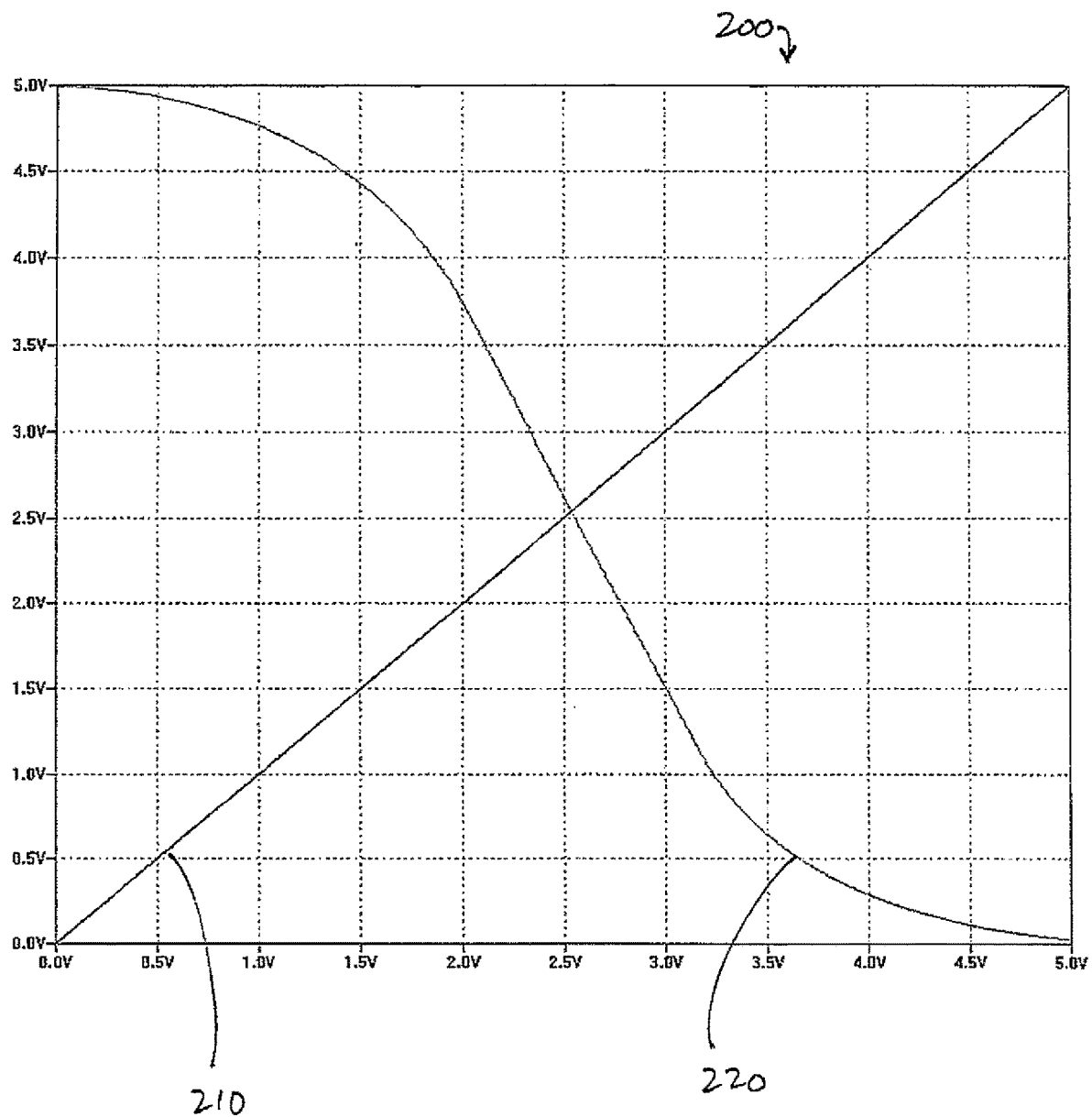
FIG. 2 is a graphical representation of a simulated performance of the CMOS inverter circuit of FIG. 1.

Referring to FIG. 2, a simulated output of the CMOS inverter circuit 100 is shown generally at 200. The input $V_{in}$ is linear, as shown by line 210, from 0.0 volts (V) to 5.0 V. The output $V_{out}$ is approximated by a sigmoid-shaped curve, as shown by line 220. Simulation of the CMOS inverter circuit 100 output may be carried out using HSPICE, which is a circuit simulation program available from Synopsis, Inc., of Mountain View, Calif., USA. In particular, for a $V_{in}$ of 5.0 volts and a $V_{supply}$ of 5.0 volts, the output 220 is sigmoid-shaped.

Figure 3:
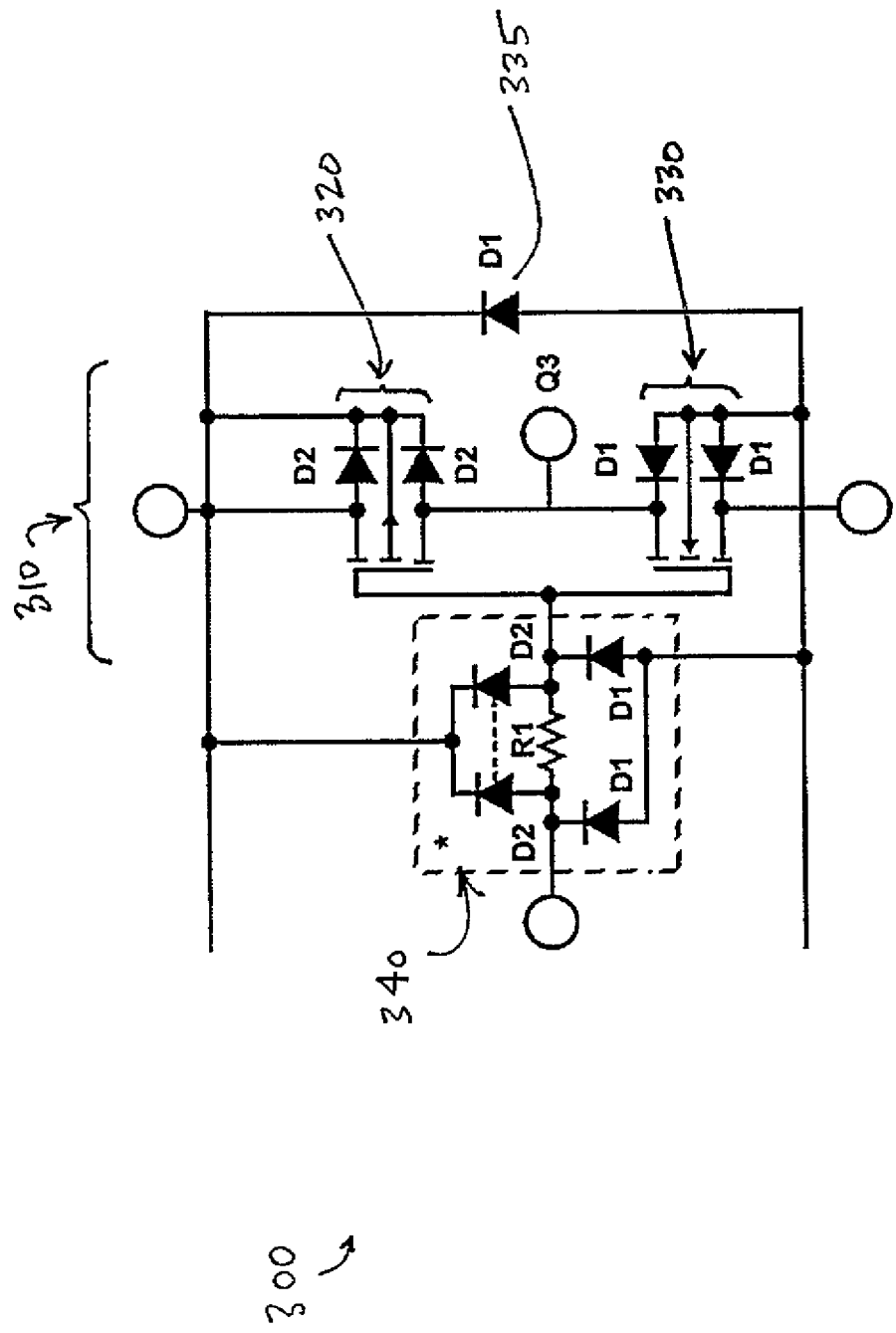
FIG. 3 is a schematic diagram of a portion of a CD4007 IC (integrated chip) employing the CMOS inverter circuit of FIG. 1.

Referring to FIG. 3, a circuit diagram of a portion of a CD4007 IC (integrated chip) employing the CMOS inverter circuit 100 is shown generally at 300 and is hereinafter referred to as "CD4007 IC 300." The CD4007 IC 300 employs three inverters 310 in a 14 pin dual in-line package, each inverter 310 comprising an NFET 320 and a PFET 330 in parallel with a diode 335 and coupled to a diode stage 340. The diode stage 340 may provide input/output protection, such as, for example, current limit protection, over voltage protection, over temperature protection, and/or ESD protection.

Figure 4:
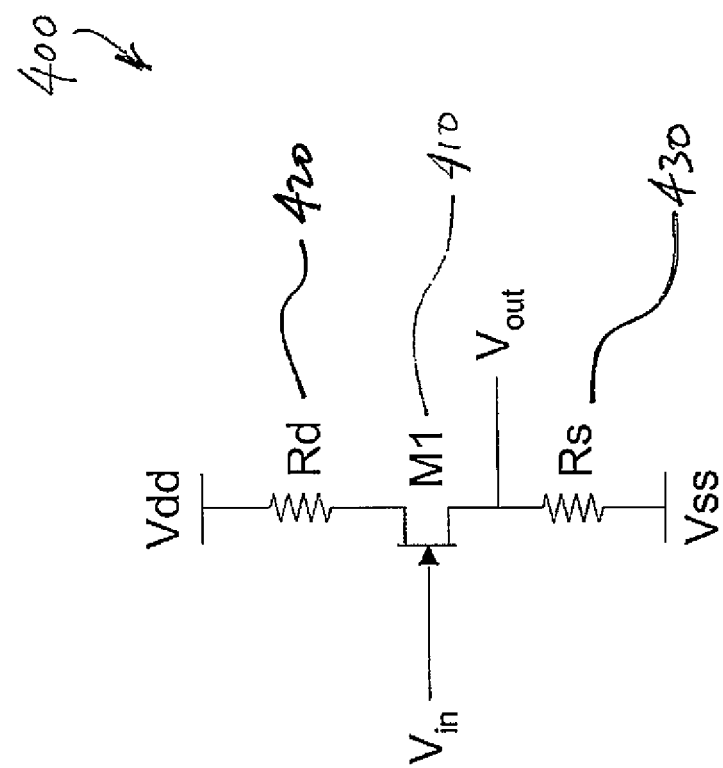
FIG. 4 is a schematic diagram of a circuit for a structure comprising one transistor.

Referring to FIG. 4, however, a circuit 400 comprising only one transistor M1 410 is shown. The transistor M1 410 may be connected to a drain supply voltage $V_{dd}$ through a resistor Rd 420 and to a source supply voltage $V_{ss}$ through a resistor Rs 430. The transistor M1 410 may also be connected to an output voltage $V_{out}$. With only one transistor, voltage levels and slopes may be adjusted, but it is not possible to produce a symmetric curve (same for positive and negative inputs).

Figure 5:
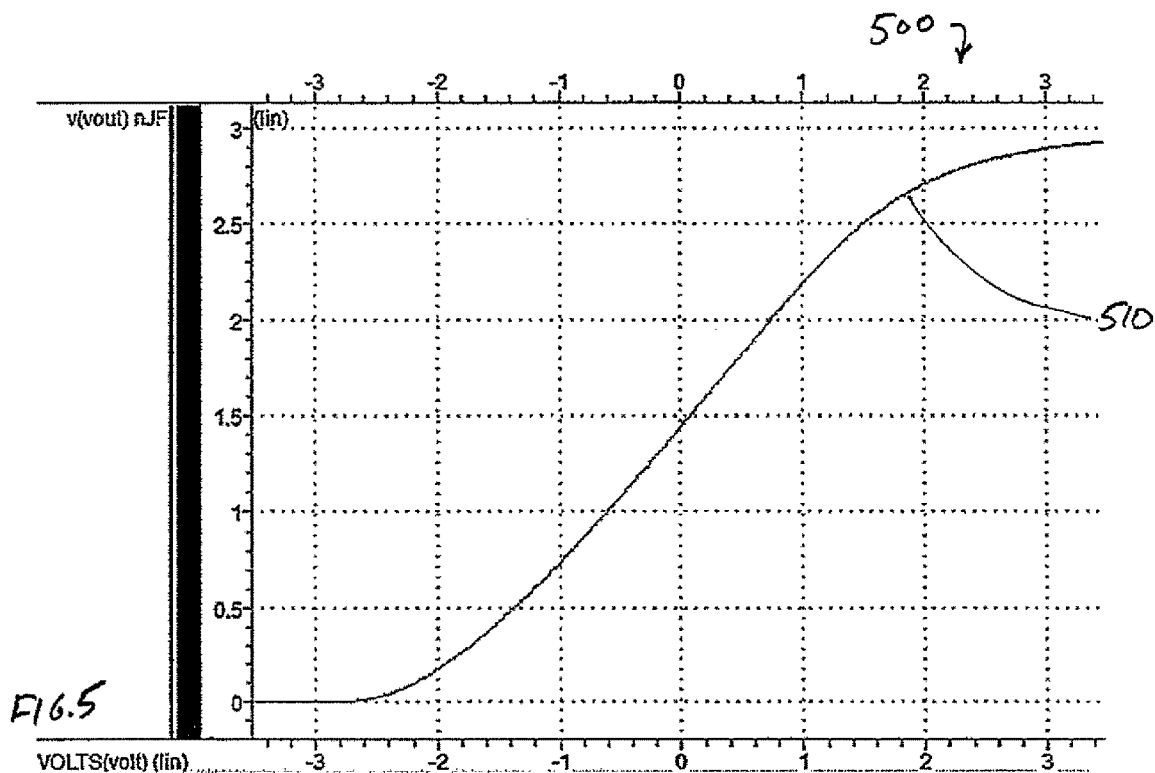
FIGS. 5 and 6 are graphical representations of computer simulation examples of the circuit of FIG. 4.
Figure 6:
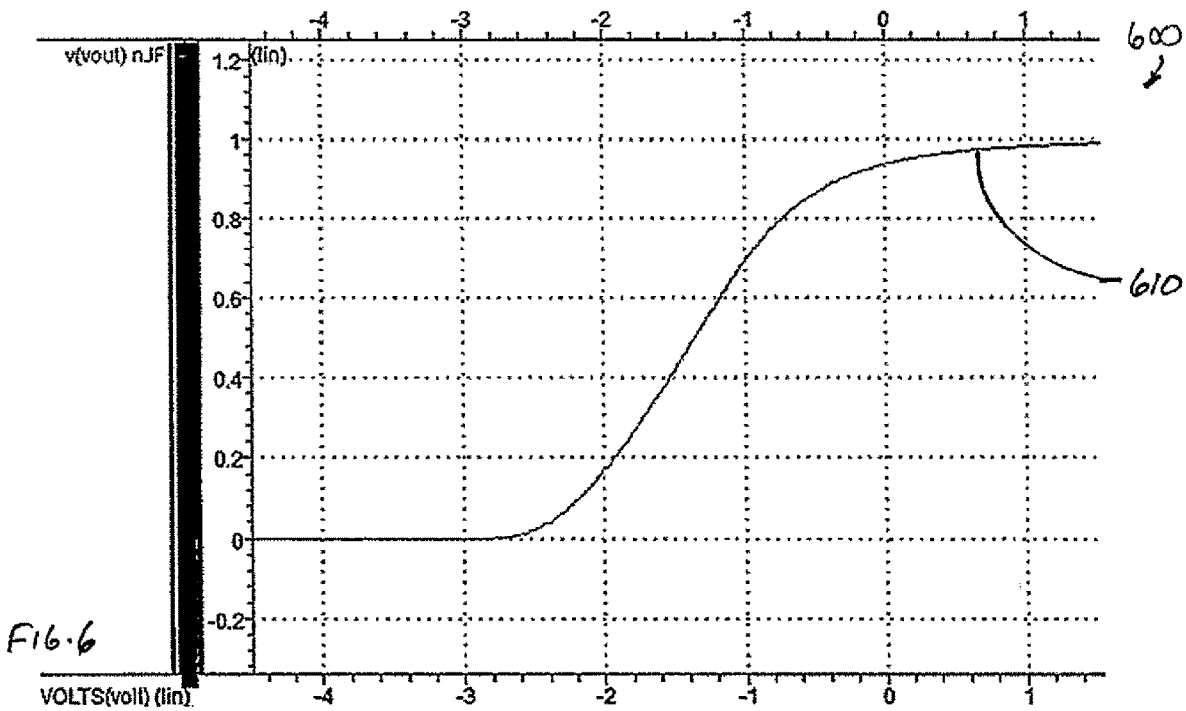

Referring to FIG. 5, an HSPICE simulation example 500 is shown for the circuit 400 in which an output of 3 V, indicated by line 510, is not symmetrical. Referring to FIG. 6, an HSPICE simulation example 600 for the circuit 400 illustrates a similar output as indicated by line 610, when the $V_{out}$ is 1 V.

Referring now to FIGS. 7-15, analog circuits for the implementation of the sigmoid function for structures where only one transistor type (n-channel or p-channel) is available, or desired to use, are shown. Such circuits may be used, for example, in applications in which complementary transistors are too expensive from a fabrication perspective. Circuits using only a single transistor type may be applicable to junction field-effect transistors (JFETs) or heterojunction field-effect transistors (HJFETs) as well as both enhancement mode and depletion mode metal oxide semiconductor field-effect transistors (MOSFETs) and thin-film field-effect transistors (such as thin-film HJFETs comprising polysilicon channel materials). Application to bipolar transistors is also possible. The various transistors and analog circuits described herein may be used with structures for the activation of neural networks or other artificial intelligence models.

Figure 7:
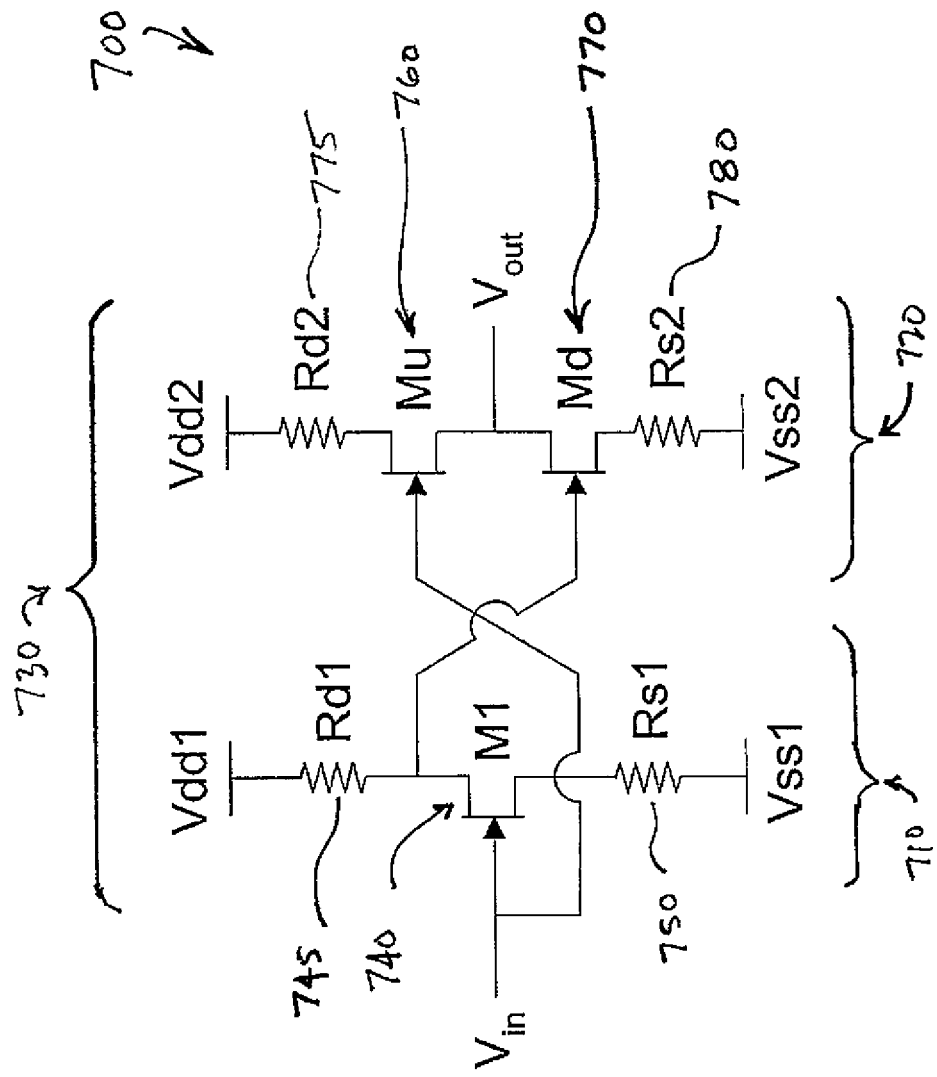
FIG. 7 is a schematic diagram of one exemplary embodiment of a circuit for a sigmoid function-producing structure comprising an inverter stage coupled to a buffer stage.

Referring to FIG. 7, one exemplary embodiment of a circuit is shown generally at 700 and is hereinafter referred to as "circuit 700." Circuit 700 may be a sigmoid function-producing circuit and may be representative of a structure comprising an inverter stage 710 coupled to a buffer stage 720 that collectively form a sigmoid stage 730. The inverter stage 710 may comprise a transistor M1 740 (and suitable resistors, for example, resistor Rd1 745 and resistor Rs1 750). The buffer stage 720 may comprise a pull-up transistor Mu 760 and a pull-down transistor Md 770 (and suitable resistors, which may be passive, for example, resistor Rd2 775 (pull-up resistor) and resistor Rs2 780 (pull-down resistor)). In any embodiment, the transistor M1 740, the pull-up transistor Mu 760, and the pull-down transistor Md 770 are of the same channel type (either re-channel or p-channel).

The buffer stage 720 may receive an input 790 from $V_{in}$ and an output 795 from the inverter stage 710. Although the input 790 is shown as being received at the pull-up transistor Mu 760 and the output 795 is shown as being received at the pull-down transistor Md 770, the circuit 700 is not limited in this regard, and the input 790 may be received at the pull-down transistor Md 770 and the output 795 may be received at the pull-up transistor Mu 760.

Also as shown, the resistor Rd1 745 may be coupled to drain supply voltage $V_{dd1}$, the resistor Rs1 750 may be coupled to source supply voltage $V_{ss1}$, the resistor Rd2 775 may be coupled to drain supply voltage $V_{dd2}$, and the resistor Rs2 780 may be coupled to source supply voltage $V_{ss2}$. In one exemplary embodiment, $V_{dd1}$ and $V_{dd2}$ may be 2 V, $V_{ss1}$ and $V_{ss2}$ may be 0 V, the resistor Rd2 775 may be 0 ohms, and the resistors Rd1 745, Rs1 750, and Rs2 780 may be 250 ohms.

A symmetrical sigmoid-shaped output may be desired to be obtained from the circuit 700 according to the function:

$$f(x)=1/(1+e^{-x}) \quad \text{(Equation 1)}.$$

Generating the function to produce the output may involve using the inverter stage 710 to invert $V_{in}$, followed by the application of $V_{in}$ to the pull-up transistor Mu 760 and the application of the inverted $V_{in}$ to the pull-down transistor Md 770. The circuit 700 may generate a function:

$$g(x)=\alpha/(1+e^{-\beta x}) \quad \text{(Equation 2)}.$$

The functions f(x) and g(x) are related as:

$$f(x)=[g(x/\beta)]/\alpha \quad \text{(Equation 3)}.$$

In order to generate the desired function f(x) as indicated by Equation 1, the coefficients α and β may be adjusted by adjusting the circuit elements and power supply levels, or adding resistive voltage dividers (or capacitive voltage dividers in switched-capacitor implementations) at the input and/or output of the buffer stage 720.

Figure 8:
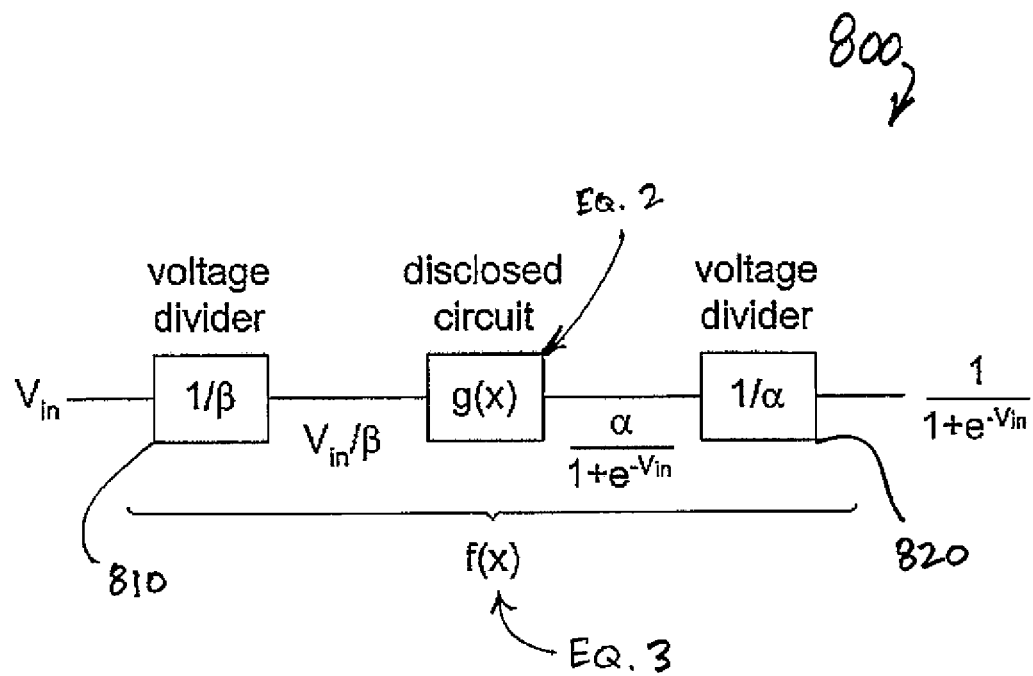
FIG. 8 is a schematic diagram of a sigmoid function-producing algorithm for use with a structure of the circuit of FIG. 7 using voltage dividers.

Referring to FIG. 8, a sigmoid function-producing algorithm 800 for the circuit 700 may include voltage dividers 810, 820, for example, that may be used at the input and the output of the sigmoid stage 730 to adjust the coefficients α and β. The voltage dividers 810, 820 may be resistive dividers or capacitive dividers.

Figure 9:
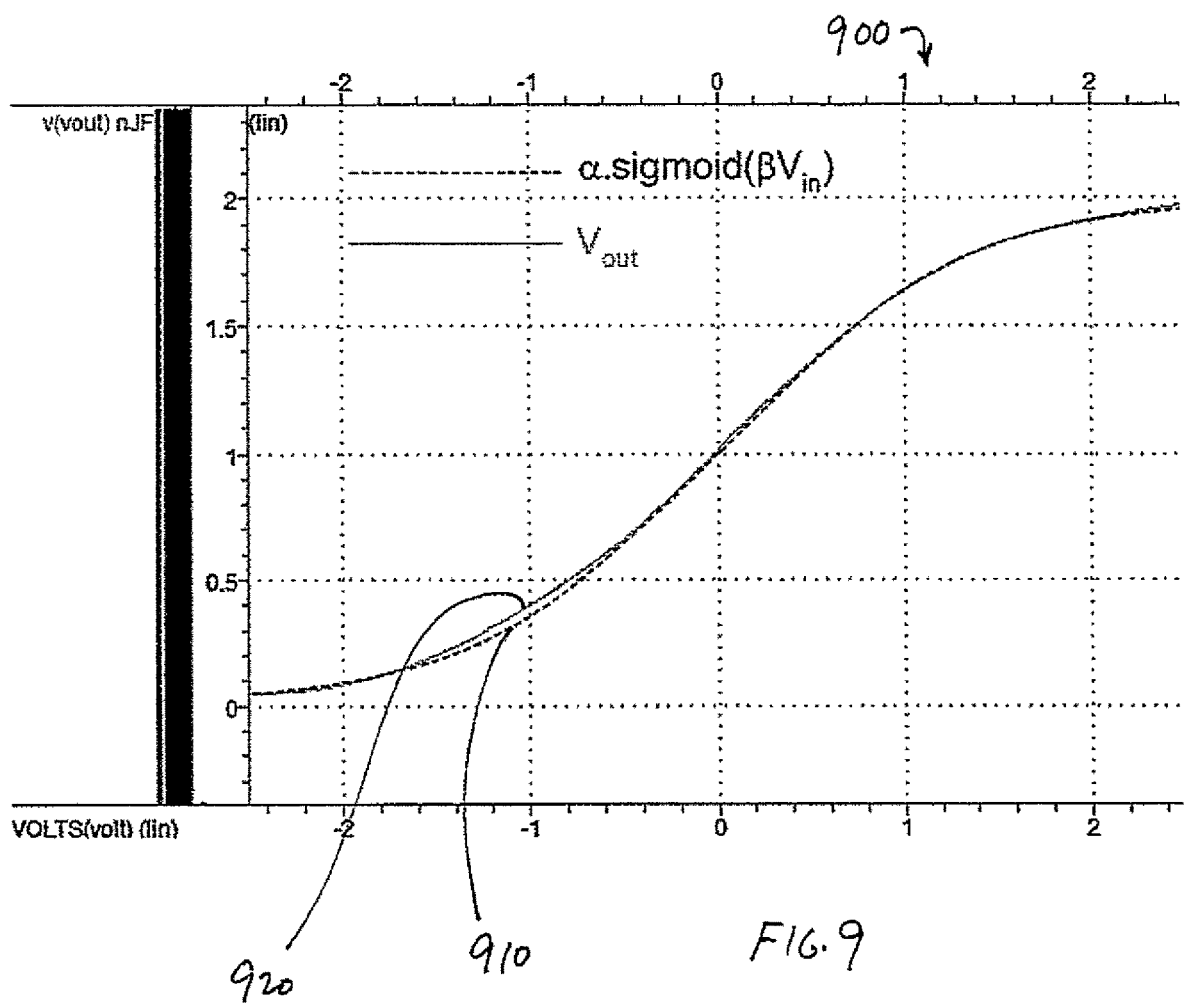
FIG. 9 is a graphical representation of a comparison of a sigmoid output and $V_{out}$ for the sigmoid function-producing circuit of FIG. 7.

Referring now to FIG. 9, a comparison of the sigmoid output g(x) and $V_{out}$ for the circuit 700 using the algorithm 800 is shown graphically at 900. Applying the sigmoid function to the circuit 900 may be based on Equation 3 and use the voltage dividers 810, 820. In doing so, a line 910 indicating the sigmoid function substantially approximates a line 920 indicating $V_{out}$.

Figure 10:
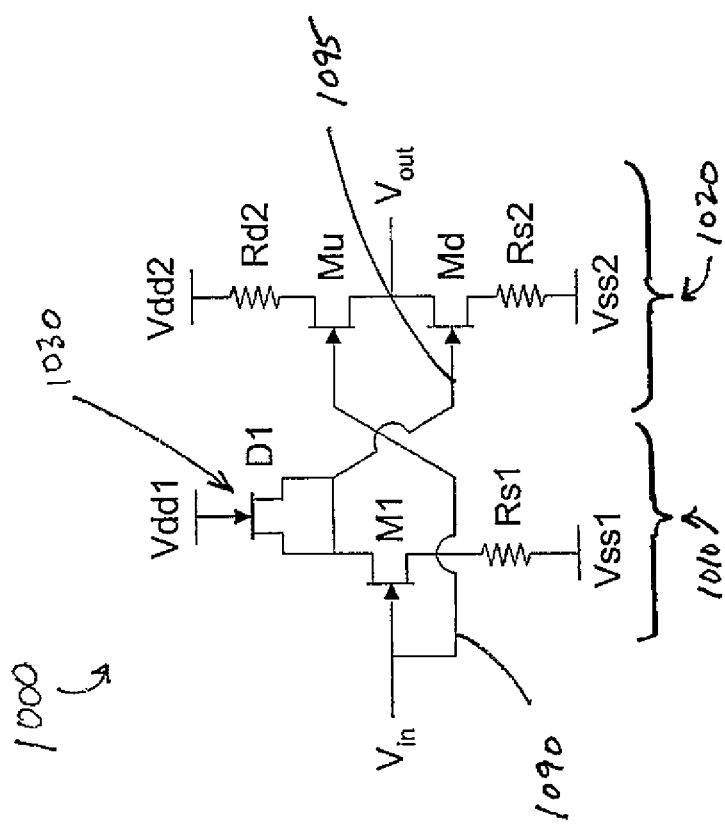
FIG. 10 is another exemplary embodiment of a circuit for a sigmoid function-producing structure in which a resistor in the inverter stage is replaced by a diode-connected JFET in which the drain is connected to the source.

Referring now to FIG. 10, one exemplary embodiment of a circuit for a sigmoid function-producing structure is shown generally at 1000. In circuit 1000, one or more of the resistors (e.g., the resistor Rd1) in an inverter stage 1010 of the circuit 1000 (which also comprises a buffer stage 1020) may be replaced by a diode-connected JFET D1 1030, with a series resistance being adjusted by the diode dimensions. As with circuit 700, the buffer stage 1020 may receive an input 1090 from $V_{in}$ and an output 1095 from the inverter stage 1010. Although the input 1090 is shown as being received at a pull-up transistor Mu and the output 1095 is being shown as being received at a pull-down transistor Md, the circuit 1000 is not limited in this regard, and the input

1090 may be received at the pull-down transistor Md and the output 1095 may be received at the pull-up transistor Mu.

Figure 11:
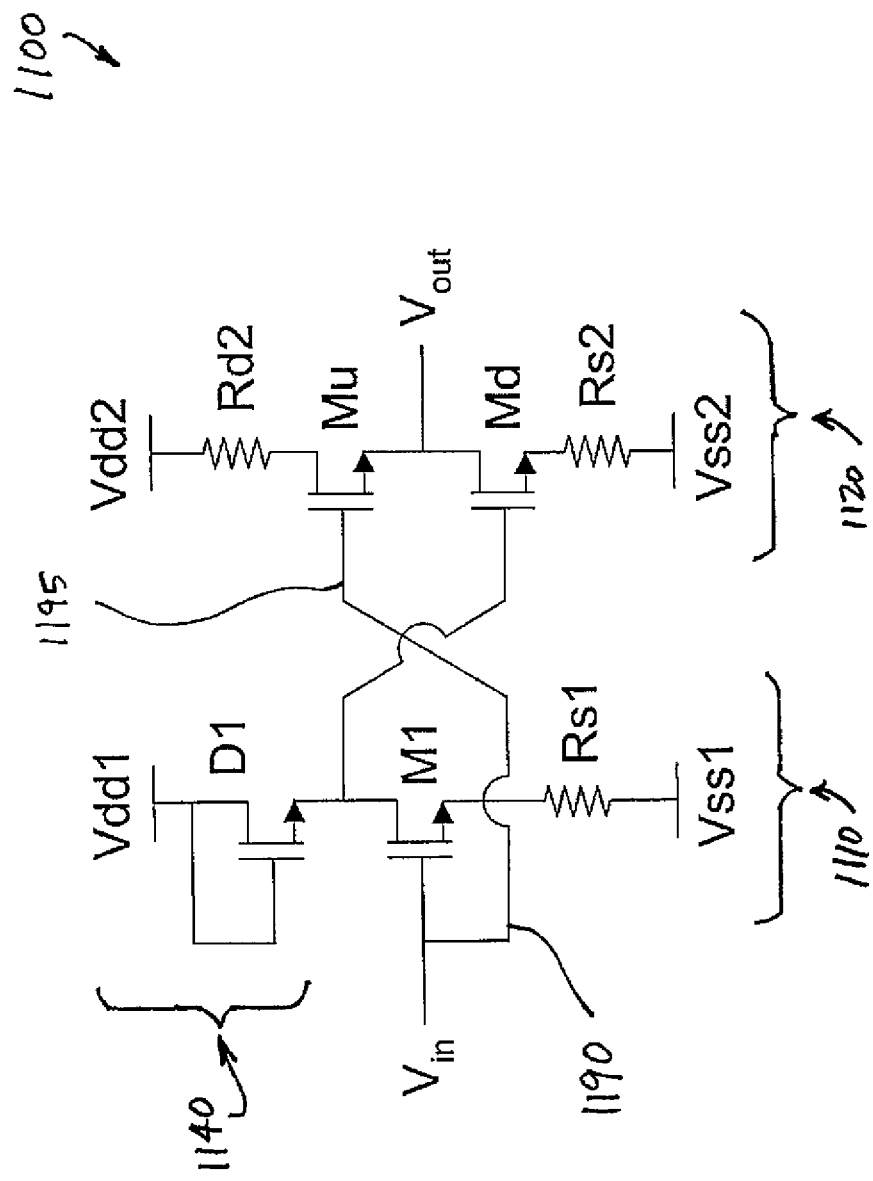
FIG. 11 is another exemplary embodiment of circuit for a sigmoid function-producing structure in which a resistor in the inverter stage is replaced by a diode-connected MOSFET in which the gate is connected to the drain.

Referring now to FIG. 11, one exemplary embodiment of a circuit for a sigmoid function-producing structure is shown generally at 1100. In circuit 1100, one or more of the resistors (e.g., the resistor Rd1) in an inverter stage 1110 of the circuit 1100 (which also comprises a buffer stage 1120) may be replaced with a diode-connected MOSFET D1 1140, in which the gate of the MOSFET is connected to the drain supply voltage $V_{dd1}$. The buffer stage 1120 may receive an input 1190 from $V_{in}$ and an output 1195 from the inverter stage 1110.

Figure 12:
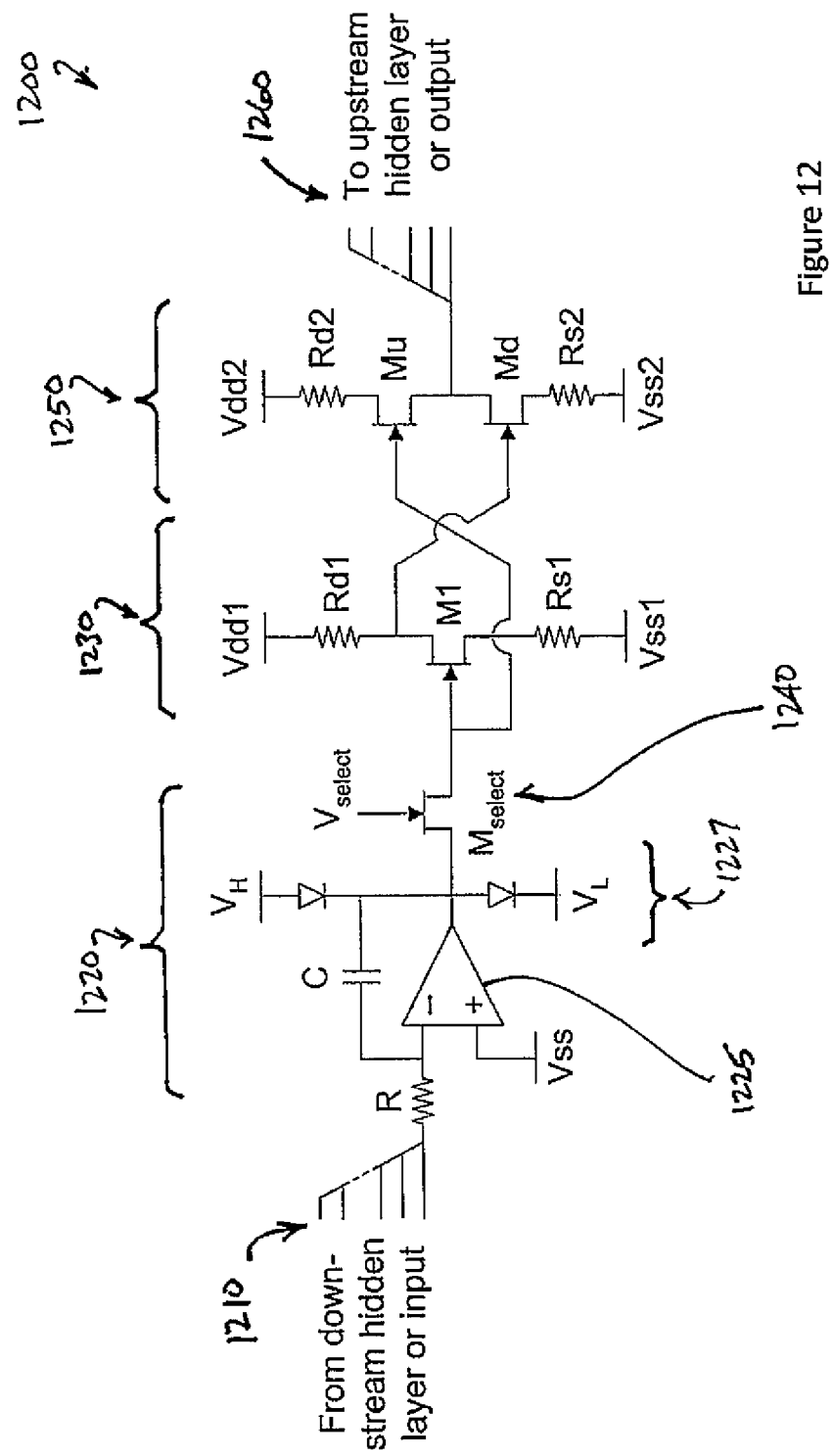
FIG. 12 is another exemplary embodiment of a circuit for a sigmoid function-producing structure in which inputs are received through an op-amp integrator before being passed to an inverter stage.

Referring now to FIG. 12, one exemplary embodiment of a circuit for a sigmoid function-producing structure is shown generally at 1200. In circuit 1200, inputs may be received from a downstream hidden layer 1210 (or directly as an input) through an op-amp integrator stage 1220 (comprising an operational amplifier 1225) before being passed to an inverter stage 1230. In the op-amp integrator stage 1220, a diode stage 1227 may be used to clip very high positive and/or negative voltages (e.g., above $V_H$ (where $V_H > 0$) and below $V_L$ (where $V_L < 0$)) before the high voltages enter the inverter stage 1230, e.g., after the op-amp integrator stage 1220. A pass transistor $N_{select}$ (controlled by the select voltage $V_{select}$ 1240 applied to its gate) between the diode stage 1227 and the inverter stage 1230 may be used to pass the output of the integrator stage 1220 to the sigmoid stage, by switching $V_{select}$ from LOW to HIGH. For example, $V_{select}$ may be switched from LOW to HIGH once the integration of the input signal 1210 by the integrator stage 1220 over a desired integration time has been completed. After passing from the inverter stage 1230 and through a buffer stage 1250, a processed signal is passed to an upstream hidden layer 1260 (or directly to an output).

Figure 13:
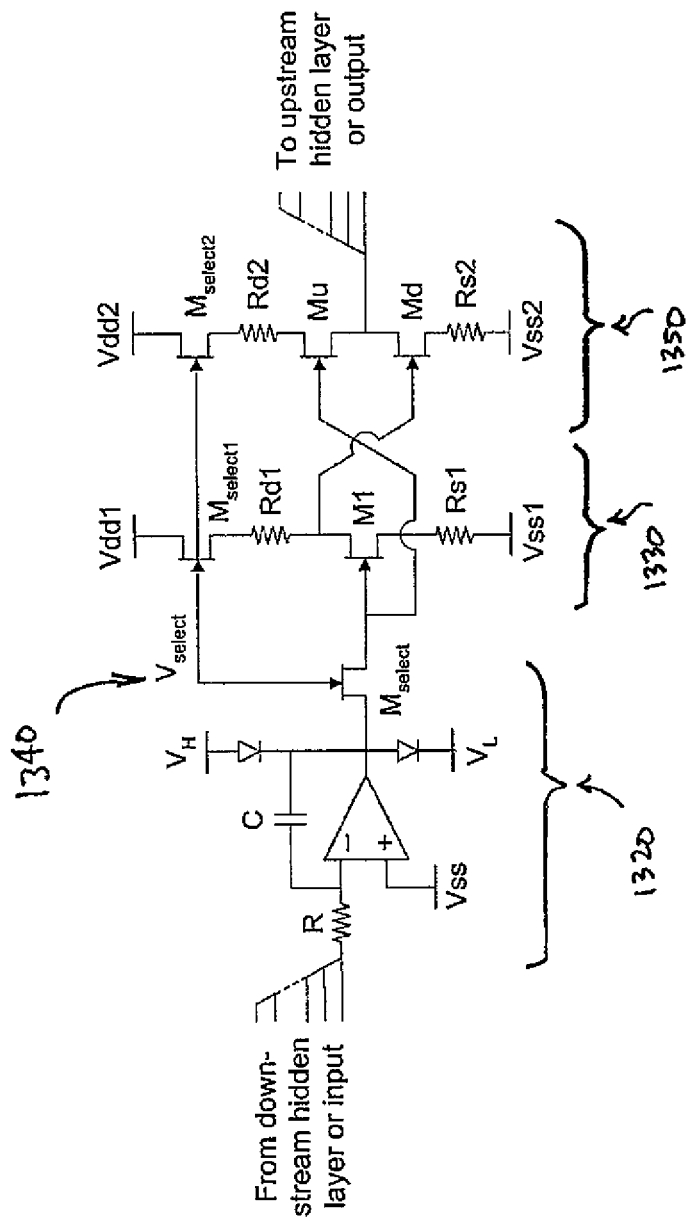
FIG. 13 is another exemplary embodiment of a circuit for a sigmoid function-producing structure in which a voltage selector is utilized to switch on various stages of the structure.

Referring now to FIG. 13, one exemplary embodiment of a circuit for a sigmoid function-producing structure is shown generally at 1300. Circuit 1300 utilizes two additional transistors $M_{select1}$ and $M_{select2}$ sharing a common gate select voltage $V_{select}$ with $M_{select}$. When the select voltage $V_{select}$ 1340 is LOW, the transistors $M_{select1}$ and $M_{select2}$ are in the OFF state and therefore the inverter stage 1330 and the buffer stage 1350 are substantially disconnected from the power supplies Vdd1 and Vdd2, respectively. As a result, the sigmoid stage consumes negligible power when $V_{select}$ is LOW. The sigmoid stage may be switched on by switching $V_{select}$ from LOW to HIGH for example once the integration time at the integrator stage 1320 has finished. Note switching $V_{select}$ from LOW to HIGH also turns on the pass transistor $M_{select}$ thus allowing the output of the integrator stage to pass to the sigmoid stage as described earlier for structure 1200. In some embodiments, structure 1300 may substantially reduce power consumption compared to the structure 1200 shown in FIG. 12 because the sigmoid stage of structure 1300 consumes negligible power when $V_{select}$ is LOW. It will be appreciated by those skilled in the art that the transistors $M_{select1}$ and $M_{select2}$ may be disposed in other locations within the inverter stage 1330 and buffer stage 1350. For example, $M_{select1}$ may be connected between Rd1 and M1, between M1 and Rs1, or between Rs1 and Vss1.

Figure 14:
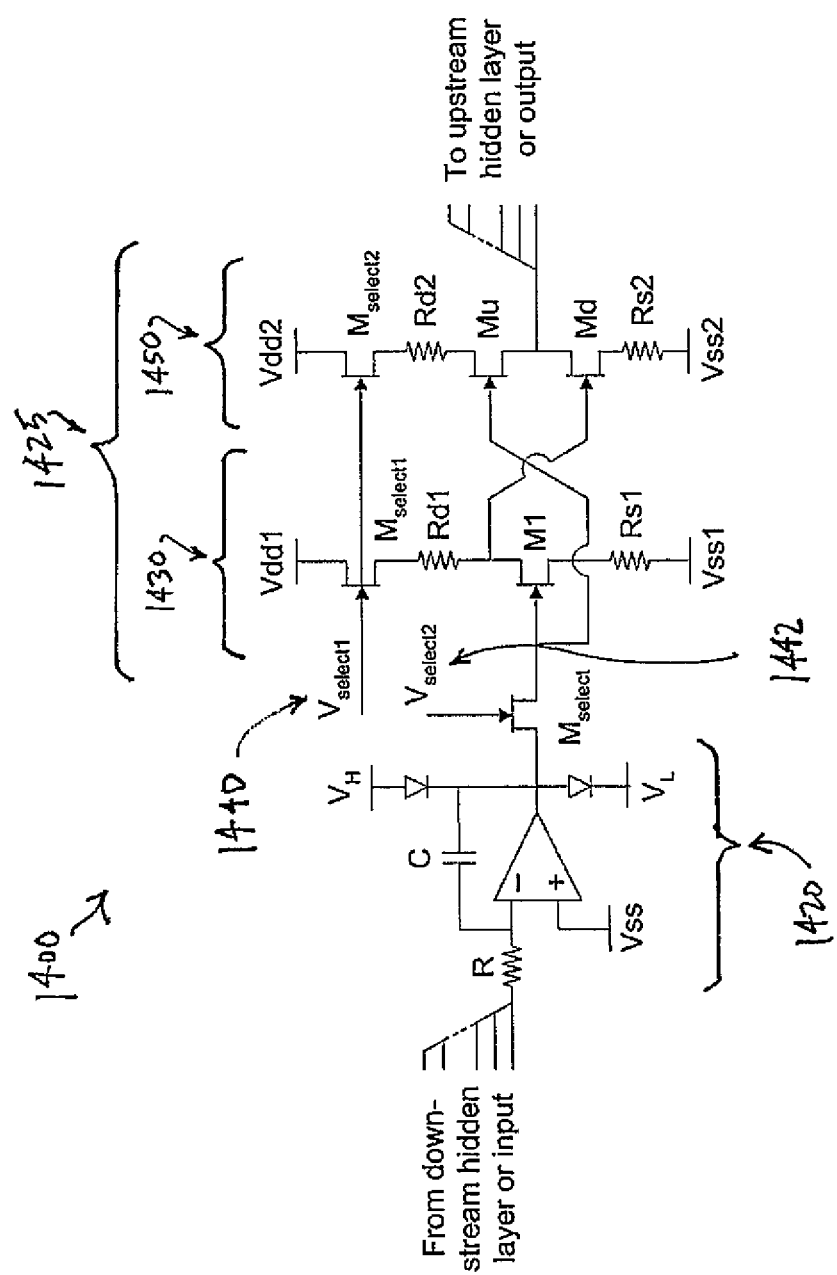
FIG. 14 is another exemplary embodiment of a circuit for a sigmoid function-producing structure incorporating multiple voltage selectors.

Referring now to FIG. 14, one exemplary embodiment of a circuit for a sigmoid function-producing structure is shown generally at 1400. Circuit 1400 may incorporate a first select voltage $V_{select1}$ 1440 (applied to the gates of $M_{select1}$ and $M_{select2}$) and a second select voltage $V_{select2}$ 1442 (applied to the gate of $M_{select}$). In such a circuit 1400, $V_{select1}$ 1440 may be coupled to a sigmoid stage 1425 comprising an inverter stage 1430 and a buffer stage 1450. The $V_{select1}$ 1440 may be turned on before $V_{select2}$ 1442 to allow the sigmoid stage 1425 to stabilize before an output of the op-amp integrator stage 1420 is passed to the inverter stage 1430 by turning on $M_{select}$.

Figure 15:
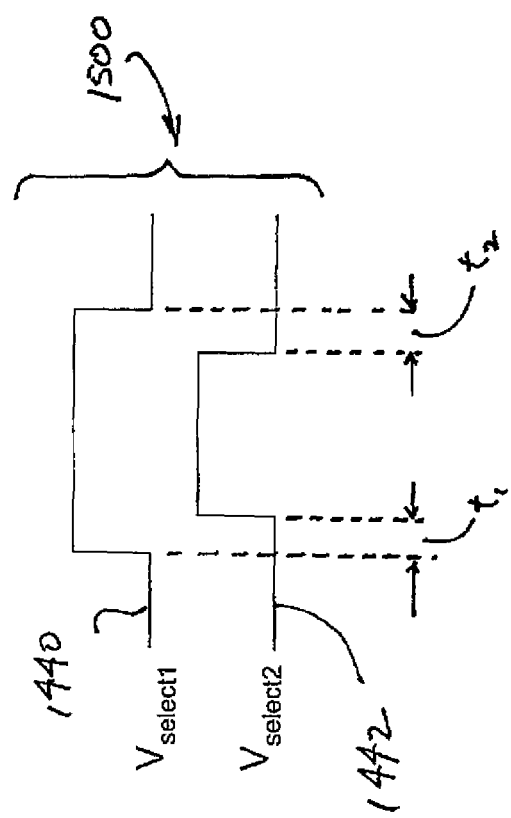
FIG. 15 is a graphical representation of an operation of the circuit of FIG. 14.

Referring to FIG. 15, an operation of the circuit 1400 is shown graphically at 1500. The operation 1500 graphically illustrates the turning on of the sigmoid stage 1425 using $V_{select1}$ 1440. As shown, turning on the sigmoid stage 1425 using $V_{select1}$ 1440 leads the turning on of $M_{select}$ using $V_{select2}$ by time t1. Furthermore, turning off the sigmoid stage 1425 using $V_{select1}$ 1440 lags the turning off of the op-amp integrator stage 1420 using $V_{select2}$ 1442 by time t2.

Referring now to all the Figures, in one exemplary embodiment, an analog circuit comprises: a first stage comprising a first stage transistor, wherein the first stage transistor is configured to receive an input signal; and a second stage coupled to the first stage, the second stage comprising a pull-up transistor and a pull-down transistor, the pull-up transistor and the pull-down transistor having the same channel type as the first stage transistor. One of the pull-up transistor and the pull-down transistor receives the input signal and the other of the pull-up transistor and the pull-down transistor receives an output of the first stage transistor. The first stage and the second stage are configured to generate a sigmoid function.

The analog circuit may further comprise at least one of a pull-up resistor in series with the pull-up transistor and a pull-down resistor in series with the pull-down transistor. One or more of the pull-up resistor and the pull-down resistor may be passive resistors. One or more of the pull-up resistor and the pull-down resistor may be active loads implemented by diode-connected transistors. The first stage transistor, the pull-up transistor, and the pull-down transistor may be either n-channel or p-channel. The first stage transistor, the pull-up transistor, and the pull-down transistor may be field-effect transistors. The field-effect transistors may be thin-film heterojunction field-effect transistors comprising polysilicon channel materials. The first stage transistor, the pull-up transistor, and the pull-down transistor may be thin-film transistors.

In another exemplary embodiment, a sigmoid function-producing analog circuit comprises: an inverter comprising a first transistor configured to receive an input voltage; and a buffer comprising a second transistor coupled to a third transistor, the second transistor configured to receive the input voltage, and the third transistor configured to receive an output voltage from the first transistor. The first transistor, the second transistor, and the third transistor are of the same channel type.

The buffer may comprise at least one resistor in series with the second transistor and the third transistor. The sigmoid function-producing analog circuit may further comprise at least one voltage divider coupled to at least one of the inverter and the buffer. The at least one voltage divider may be at least one of a resistive divider and a capacitive divider. The sigmoid function-producing analog circuit may further comprise an integrator stage coupled to the inverter between the input voltage and the inverter. The integrator stage may further comprise a diode stage used to clip high voltages after integration. The sigmoid function-producing analog circuit may further comprise at least one select voltage connected to the gates of one or more select transistors incorporated into the circuit, wherein the at least one select voltage may be configured to selectively switch power on and off at one or more of the inverter and the buffer.

In another exemplary embodiment, a method comprises: receiving an input voltage at a first transistor and at a second transistor; inverting the input voltage from the first transistor and applying the inverted input voltage to a third transistor; and generating a sigmoid function output from the second transistor and the third transistor.

The method may further comprise integrating the input voltage received at the first transistor and at the second transistor. The method may further comprise clipping high voltages using a diode stage. The method may further comprise adjusting one or more of circuit elements, adjusting power supply levels, and adding a voltage divider. The method may further comprise selectively switching power on and off at one or more of the first transistor, the second transistor, and the third transistor.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

What is claimed is:

1. An analog circuit, comprising:
a first stage comprising a first stage transistor, wherein the first stage transistor is configured to receive an input signal; and
a second stage coupled to the first stage, the second stage comprising a pull-up transistor and a pull-down transistor, the pull-up transistor and the pull-down transistor having the same channel type as the first stage transistor;
wherein one of the pull-up transistor and the pull-down transistor receives the input signal and the other of the pull-up transistor and the pull-down transistor receives an output of the first stage transistor; and
wherein the first stage and the second stage are configured to generate a sigmoid function.

2. The analog circuit of claim 1, further comprising at least one of a pull-up resistor in series with the pull-up transistor and a pull-down resistor in series with the pull-down transistor.

3. The analog circuit of claim 2, wherein one or more of the pull-up resistor and the pull-down resistor are passive resistors.

4. The analog circuit of claim 2, wherein one or more of the pull-up resistor and the pull-down resistor are active loads implemented by diode-connected transistors.

5. The analog circuit of claim 1, wherein the first stage transistor, the pull-up transistor, and the pull-down transistor are either n-channel or p-channel.

6. The analog circuit of claim 1, wherein the first stage transistor, the pull-up transistor, and the pull-down transistor are field-effect transistors.

7. The analog circuit of claim 6, wherein the field-effect transistors are thin-film heterojunction field-effect transistors comprising polysilicon channel materials.

8. The analog circuit of claim 1, wherein the first stage transistor, the pull-up transistor, and the pull-down transistor are thin-film transistors.

9. A sigmoid function-producing analog circuit, comprising:
an inverter comprising a first transistor configured to receive an input voltage; and
a buffer comprising a second transistor coupled to a third transistor, the second transistor configured to receive the input voltage, and the third transistor configured to receive an output voltage from the first transistor;
wherein the first transistor, the second transistor, and the third transistor are of the same channel type.

10. The sigmoid function-producing analog circuit of claim 9, wherein the buffer comprises at least one resistor in series with the second transistor and the third transistor.

11. The sigmoid function-producing analog circuit of claim 9, further comprising at least one voltage divider coupled to at least one of the inverter and the buffer.

12. The sigmoid function-producing analog circuit of claim 11, wherein the at least one voltage divider is at least one of a resistive divider and a capacitive divider.

13. The sigmoid function-producing analog circuit of claim 9, further comprising an integrator stage coupled to the inverter between the input voltage and the inverter.

14. The sigmoid function-producing analog circuit of claim 13, wherein the integrator stage further comprises a diode stage used to clip high voltages after integration.

15. The sigmoid function-producing analog circuit of claim 9, further comprising at least one select voltage connected to the gates of one or more select transistors incorporated into the circuit, wherein the at least one select voltage is configured to selectively switch power on and off at one or more of the inverter and the buffer.

16. A method, comprising:
receiving an input voltage at a first transistor and at a second transistor;
inverting the input voltage from the first transistor and applying the inverted input voltage to a third transistor; and
generating a sigmoid function output from the second transistor and the third transistor.

17. The method of claim 16, further comprising integrating the input voltage received at the first transistor and at the second transistor.

18. The method of claim 17, further comprising clipping high voltages using a diode stage.

19. The method of claim 16, further comprising adjusting one or more of circuit elements, adjusting power supply levels, and adding a voltage divider.

20. The method of claim 16, further comprising selectively switching power on and off at one or more of the first transistor, the second transistor, and the third transistor.

\* \* \* \* \*